United States Patent
Chakravarthy et al.

(10) Patent No.: US 12,554,965 B2
(45) Date of Patent: Feb. 17, 2026

(54) SYSTEMS AND METHODS FOR DETERMINING REPAIRS FOR FAILED RESOURCE TRANSFERS USING NEURAL NETWORK DEEP EMBEDDED CLUSTERING

(71) Applicant: BANK OF AMERICA CORPORATION, Charlotte, NC (US)

(72) Inventors: Lavanya Thirumazhisai Chakravarthy, Tamil Nadu (IN); Bakkialakshmi Shanmugam, Tamil Nadu (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 952 days.

(21) Appl. No.: 17/742,485

(22) Filed: May 12, 2022

(65) Prior Publication Data

US 2023/0367992 A1    Nov. 16, 2023

(51) Int. Cl.
*G06N 3/04* (2023.01)
*G06F 9/50* (2006.01)
*G06F 18/214* (2023.01)

(52) U.S. Cl.
CPC .............. *G06N 3/04* (2013.01); *G06F 9/505* (2013.01); *G06F 9/5072* (2013.01); *G06F 18/2148* (2023.01)

(58) Field of Classification Search
CPC ......... G06N 3/04; G06F 9/505; G06F 9/5072; G06F 18/2148
See application file for complete search history.

(56) References Cited

U.S. PATENT DOCUMENTS

| 7,900,201 B1 * | 3/2011 | Qureshi | G06N 5/048 717/124 |
| 10,521,633 B2 * | 12/2019 | Stephen | G06K 7/1417 |

(Continued)

FOREIGN PATENT DOCUMENTS

WO    WO-2020155814 A1 *    8/2020    ............. G06Q 10/20

OTHER PUBLICATIONS

Xie et al., "Unsupervised Deep Embedding for Clustering Analysis", May 24, 2016, available at https://arxiv.org/pdf/1511.06335.*

*Primary Examiner* — Matthew Ell
(74) *Attorney, Agent, or Firm* — Moore & Van Allen PLLC; R.W. McCord Rayburn

(57) ABSTRACT

Systems, computer program products, and methods are described herein for determining repairs for resource transfers using neural network deep embedded clustering. The present invention may be configured to train, based on historical data associated with historical resource transfers, a first machine learning model to determine, based on historical attributes of the historical resource transfers, clusters of the historical resource transfers and train, based on the historical data associated with the historical resource transfers, a second machine learning model to determine historical repairs for failed historical resource transfers of the historical resource transfers. The present invention may be configured to determine, using the first machine learning model, a cluster, from the clusters, corresponding to a resource transfer and determine, using the second machine learning model, likelihoods of success of repairs, from the historical repairs, for the resource transfer.

20 Claims, 4 Drawing Sheets

(56) References Cited

U.S. PATENT DOCUMENTS

| | | | | |
|---|---|---|---|---|
| 2020/0143499 | A1* | 5/2020 | Erdem | G06N 5/01 |
| 2020/0258057 | A1* | 8/2020 | Farahat | G06Q 10/20 |
| 2020/0349511 | A1* | 11/2020 | Seaver | G06Q 10/06312 |
| 2022/0027249 | A1* | 1/2022 | Dua | G06F 11/3466 |
| 2023/0058933 | A1* | 2/2023 | Connor | G06Q 20/227 |
| 2023/0230063 | A1* | 7/2023 | Meenavalli | G06Q 20/42 |
| | | | | 705/39 |
| 2023/0297904 | A1* | 9/2023 | Cella | G06N 3/126 |
| | | | | 705/7.12 |

* cited by examiner

SYSTEMS AND METHODS FOR DETERMINING REPAIRS FOR FAILED RESOURCE TRANSFERS USING NEURAL NETWORK DEEP EMBEDDED CLUSTERING

FIELD OF THE INVENTION

The present invention embraces systems and methods for determining repairs for resource transfers using neural network deep embedded clustering.

BACKGROUND

An electronic system may be configured to attempt to process resource transfers. The electronic system may be configured to generate, based on a failed attempt to process a resource transfer, an error code and provide the error code and the resource transfer to another system for repair.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. This summary presents some concepts of one or more embodiments of the present invention in a simplified form as a prelude to the more detailed description that is presented later.

In one aspect, the present invention embraces a system for determining repairs for resource transfers using neural network deep embedded clustering. The system may include at least one processing device, and at least one non-transitory storage device may include computer-executable program code that, when executed by the at least one processing device, causes the at least one processing device to train, based on historical data associated with historical resource transfers, a first machine learning model to determine, based on historical attributes of the historical resource transfers, clusters of the historical resource transfers and train, based on the historical data associated with the historical resource transfers, a second machine learning model to determine historical repairs for failed historical resource transfers of the historical resource transfers. The at least one non-transitory storage device may include computer-executable program code that, when executed by the at least one processing device, causes the at least one processing device to generate, based on the clusters of the historical resource transfers and the historical repairs for the failed historical resource transfers, a knowledge graph and receive a resource transfer. The at least one non-transitory storage device may include computer-executable program code that, when executed by the at least one processing device, causes the at least one processing device to determine, using the first machine learning model and based on attributes of the resource transfer, a cluster, from the clusters, corresponding to the resource transfer and determine, using the second machine learning model, based on the cluster and based on the knowledge graph, likelihoods of success of repairs, from the historical repairs, for the resource transfer. The at least one non-transitory storage device may include computer-executable program code that, when executed by the at least one processing device, causes the at least one processing device to cause a user device to display an interface, where the interface includes a list ranking the repairs for the resource transfer based on the likelihoods.

In some embodiments, the historical data may include the historical attributes of the historical resource transfers, and the historical attributes may include characteristics of the historical resource transfers, outcomes of processing the historical resource transfers, error codes from failed historical resource transfers, repairs applied to the failed historical resource transfers, and outcomes of processing repaired historical resource transfers.

In some embodiments, the at least one non-transitory storage device may include computer-executable program code that, when executed by the at least one processing device, causes the at least one processing device to, when training the second machine learning model to determine the repairs for the failed historical resource transfers, train the second machine learning model to determine, for each cluster of the clusters, a subset of the repairs for the failed historical resource transfers within the cluster. Additionally, or alternatively, the at least one non-transitory storage device may include computer-executable program code that, when executed by the at least one processing device, causes the at least one processing device to, when training the second machine learning model to determine, for each cluster of the clusters, the subset of the repairs for the failed historical resource transfers within the cluster, train the second machine learning model to determine, for each failed historical resource transfer within the cluster, a repair for the failed historical resource transfer.

In some embodiments, the at least one non-transitory storage device may include computer-executable program code that, when executed by the at least one processing device, causes the at least one processing device to determine the attributes of the resource transfer.

In some embodiments, the at least one non-transitory storage device may include computer-executable program code that, when executed by the at least one processing device, causes the at least one processing device to determine, based on the cluster corresponding to the resource transfer and based on the knowledge graph, the repairs, from the historical repairs, for the resource transfer.

In some embodiments, the at least one non-transitory storage device may include computer-executable program code that, when executed by the at least one processing device, causes the at least one processing device to, when causing the user device to display the interface, cause the user device to display the interface, where the list includes a drop-down menu having a repair, of the repairs, having a highest likelihood at a top of the drop-down menu.

In some embodiments, the at least one non-transitory storage device may include computer-executable program code that, when executed by the at least one processing device, causes the at least one processing device to receive, from the user device, an indication of user input selecting, via the interface, a repair of the repairs from the list. Additionally, or alternatively, the at least one non-transitory storage device may include computer-executable program code that, when executed by the at least one processing device, causes the at least one processing device to perform, in response to receiving the indication, the repair on the resource transfer.

In some embodiments, the at least one non-transitory storage device may include computer-executable program code that, when executed by the at least one processing device, causes the at least one processing device to, after training the first machine learning model, after training the second machine learning model, and after generating the knowledge graph, receive additional data associated with additional resource transfers processed after the historical resource transfers and retrain, based on the additional data and based on the historical data, the first machine learning model to determine updated clusters of the additional resource transfers and the historical resource transfers. Additionally, or alternatively, the at least one non-transitory storage device may include computer-executable program code that, when executed by the at least one processing device, causes the at least one processing device to, after training the first machine learning model, after training the second machine learning model, and after generating the knowledge graph, retrain, based on the additional data and the historical data, the second machine learning model to determine updated repairs for the failed historical resource transfers and failed additional resource transfers of the additional resource transfers.

In some embodiments, the at least one non-transitory storage device may include computer-executable program code that, when executed by the at least one processing device, causes the at least one processing device to, after training the first machine learning model, after training the second machine learning model, and after generating the knowledge graph, regenerate, based on the updated clusters and the updated repairs, the knowledge graph. Additionally, or alternatively, the at least one non-transitory storage device may include computer-executable program code that, when executed by the at least one processing device, causes the at least one processing device to, after training the first machine learning model, after training the second machine learning model, and after generating the knowledge graph, receive another resource transfer, determine, using the first machine learning model and based on attributes of the other resource transfer, another cluster, from the updated clusters, corresponding to the other resource transfer, determine, using the second machine learning model, based on the other cluster corresponding to the other resource transfer and based on the knowledge graph, likelihoods of success of repairs, from the historical repairs, for the other resource transfer, and cause the user device to display another interface, where the other interface includes another list ranking the repairs for the other resource transfer based on the likelihoods.

In some embodiments, the additional data may include additional attributes of the additional resource transfers, and the additional attributes may include characteristics of the additional resource transfers, outcomes of processing the additional resource transfers, error codes from failed additional resource transfers, repairs applied to the failed additional resource transfers, and outcomes of processing repaired additional resource transfers.

In some embodiments, the at least one non-transitory storage device may include computer-executable program code that, when executed by the at least one processing device, causes the at least one processing device to generate, based on the additional data, based on the historical data, and based on the knowledge graph, a report including the historical repairs for the failed historical resource transfers and additional repairs performed on failed additional resource transfers of the additional resource transfers, where the historical repairs and the additional repairs are grouped in the report based on at least one of error codes or the clusters and cause another user device to display another interface including the report.

In some embodiments, the historical attributes of the historical resource transfers may include historical characteristics of the historical resource transfers, where the historical characteristics include, for each historical resource transfer of the historical resource transfers, a geographic region of origin of the historical resource transfer, a building of origin of the historical resource transfer, a currency of the historical resource transfer, a processing center that attempted to process the historical resource transfer, and an amount of resources of the historical resource transfer. Additionally, or alternatively, the attributes of the resource transfer may include characteristics of the resource transfer, where the characteristics include a geographic region of origin of the resource transfer, a building of origin of the resource transfer, a currency of the resource transfer, a processing center that attempted to process the resource transfer, and an amount of resources of the resource transfer.

In some embodiments, the at least one non-transitory storage device may include computer-executable program code that, when executed by the at least one processing device, causes the at least one processing device to determine the historical repairs for the failed historical resource transfers by comparing, for each of the failed historical resource transfers, input data provided for processing the failed historical resource transfer and output data generated after the failed historical resource transfer successfully processed.

In another aspect, the present invention embraces a computer program product for determining repairs for resource transfers using neural network deep embedded clustering. The computer program product may include a non-transitory computer-readable medium including code that, when executed by a first apparatus, causes the first apparatus to train, based on historical data associated with historical resource transfers, a first machine learning model to determine, based on historical attributes of the historical resource transfers, clusters of the historical resource transfers and train, based on the historical data associated with the historical resource transfers, a second machine learning model to determine historical repairs for failed historical resource transfers of the historical resource transfers. The computer program product may include a non-transitory computer-readable medium including code that, when executed by a first apparatus, causes the first apparatus to generate, based on the clusters of the historical resource transfers and the historical repairs for the failed historical resource transfers, a knowledge graph and receive a resource transfer. The computer program product may include a non-transitory computer-readable medium including code that, when executed by a first apparatus, causes the first apparatus to determine, using the first machine learning model and based on attributes of the resource transfer, a cluster, from the clusters, corresponding to the resource transfer and determine, using the second machine learning model, based on the cluster and based on the knowledge graph, likelihoods of success of repairs, from the historical repairs, for the resource transfer. The computer program product may include a non-transitory computer-readable medium including code that, when executed by a first apparatus, causes the first apparatus to cause a user device to display an interface, where the interface includes a list ranking the repairs for the resource transfer based on the likelihoods.

In yet another aspect, a method for determining repairs for resource transfers using neural network deep embedded clustering is presented. The method may include training, based on historical data associated with historical resource transfers, a first machine learning model to determine, based on historical attributes of the historical resource transfers, clusters of the historical resource transfers and training, based on the historical data associated with the historical resource transfers, a second machine learning model to determine historical repairs for failed historical resource transfers of the historical resource transfers. The method may include generating, based on the clusters of the historical resource transfers and the historical repairs for the failed historical resource transfers, a knowledge graph and receiving a resource transfer. The method may include determining, using the first machine learning model and based on attributes of the resource transfer, a cluster, from the clusters, corresponding to the resource transfer and determining, using the second machine learning model, based on the cluster and based on the knowledge graph, likelihoods of success of repairs, from the historical repairs, for the resource transfer. The method may include causing a user device to display an interface, where the interface includes a list ranking the repairs for the resource transfer based on the likelihoods.

The features, functions, and advantages that have been discussed may be achieved independently in various embodiments of the present invention or may be combined with yet other embodiments, further details of which may be seen with reference to the following description and drawings.

BRIEF DESCRIPTION OF THE DRAWINGS

Figure 1:
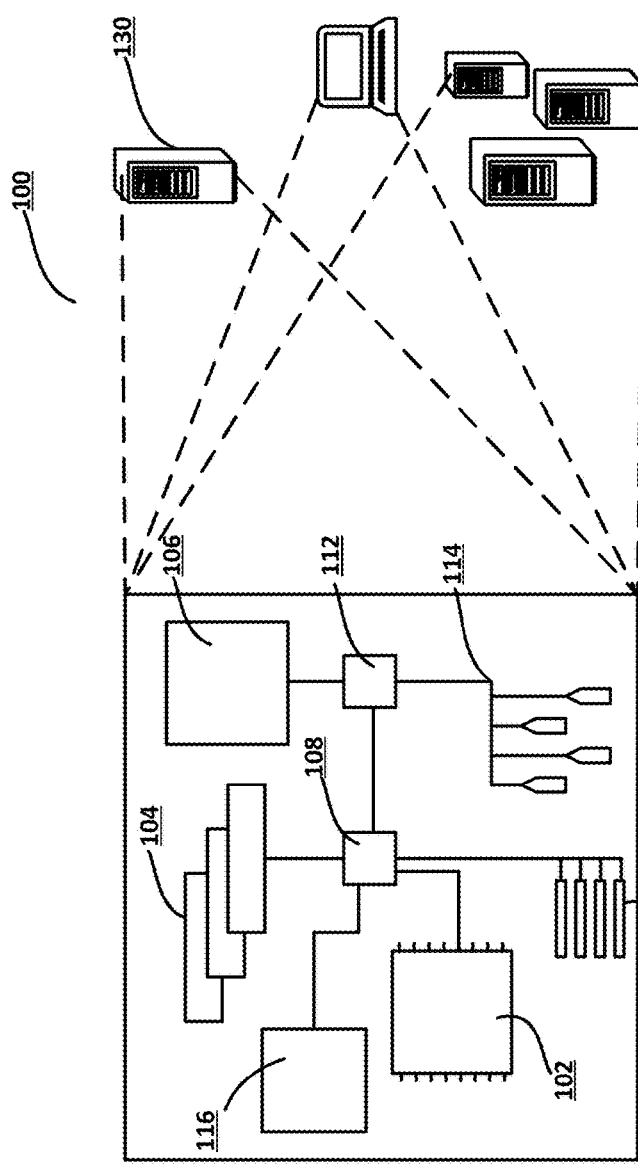
Figure 1:
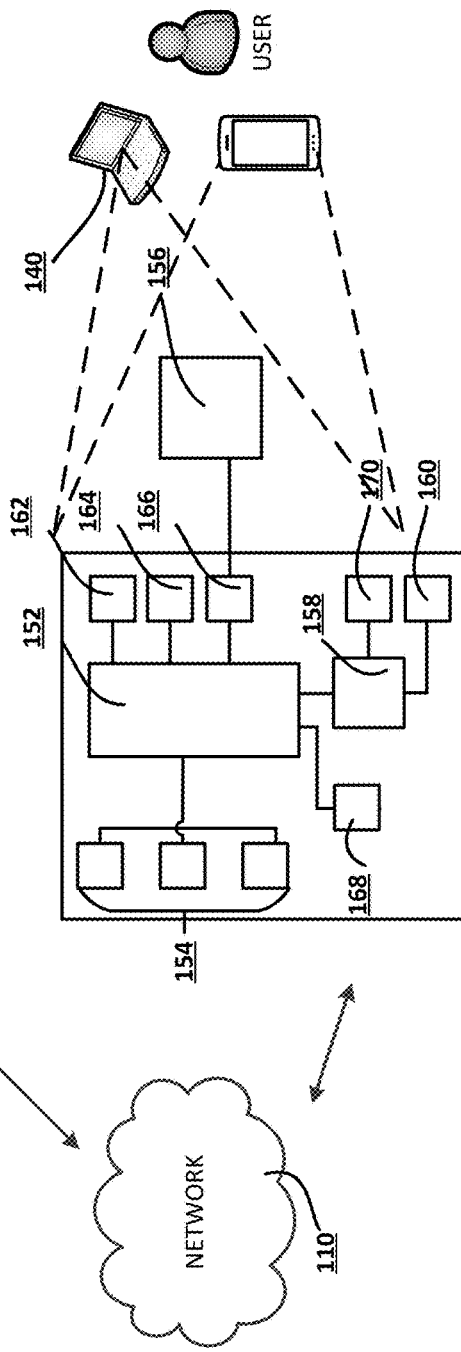
Figure 2:
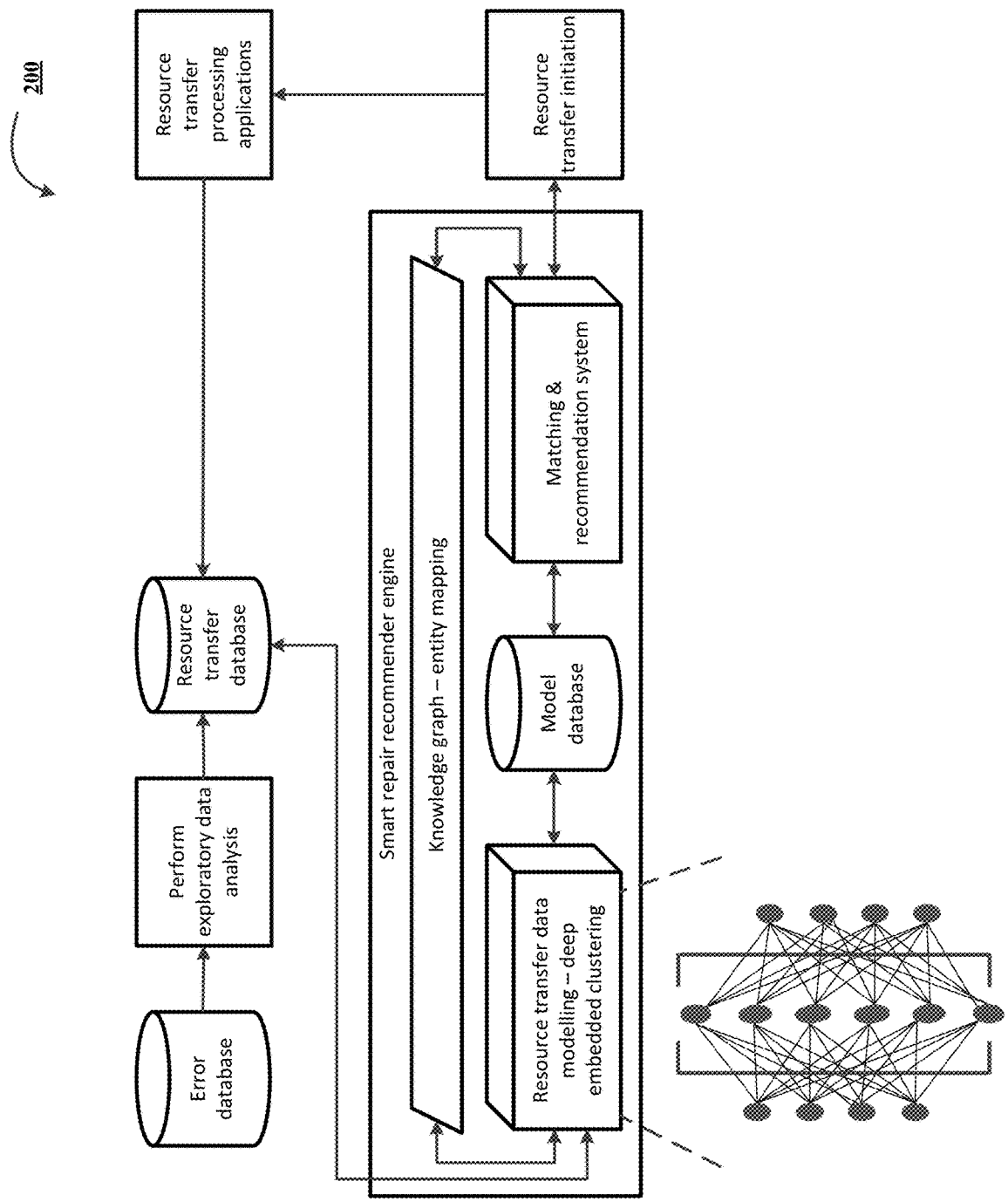
Figure 3:
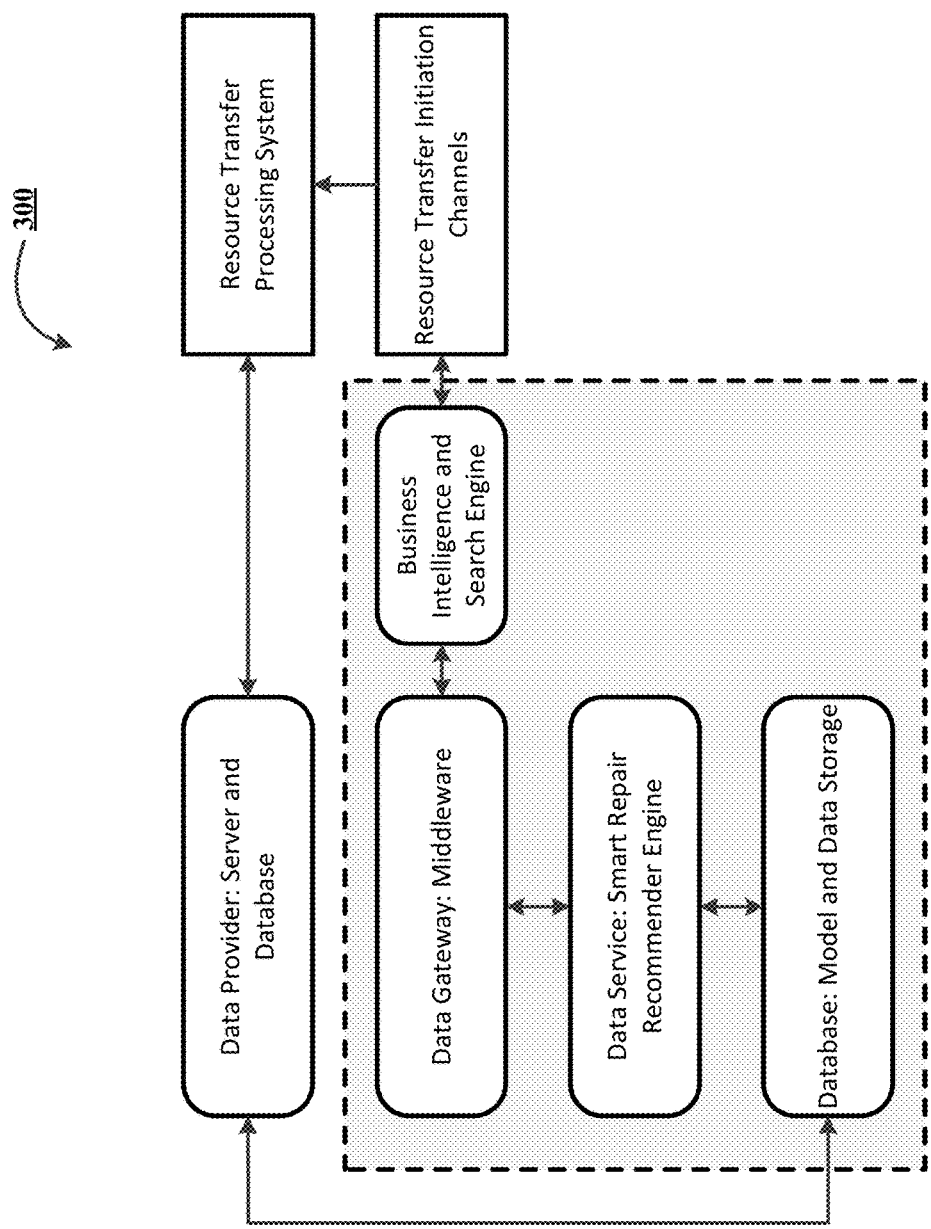
Figure 4:
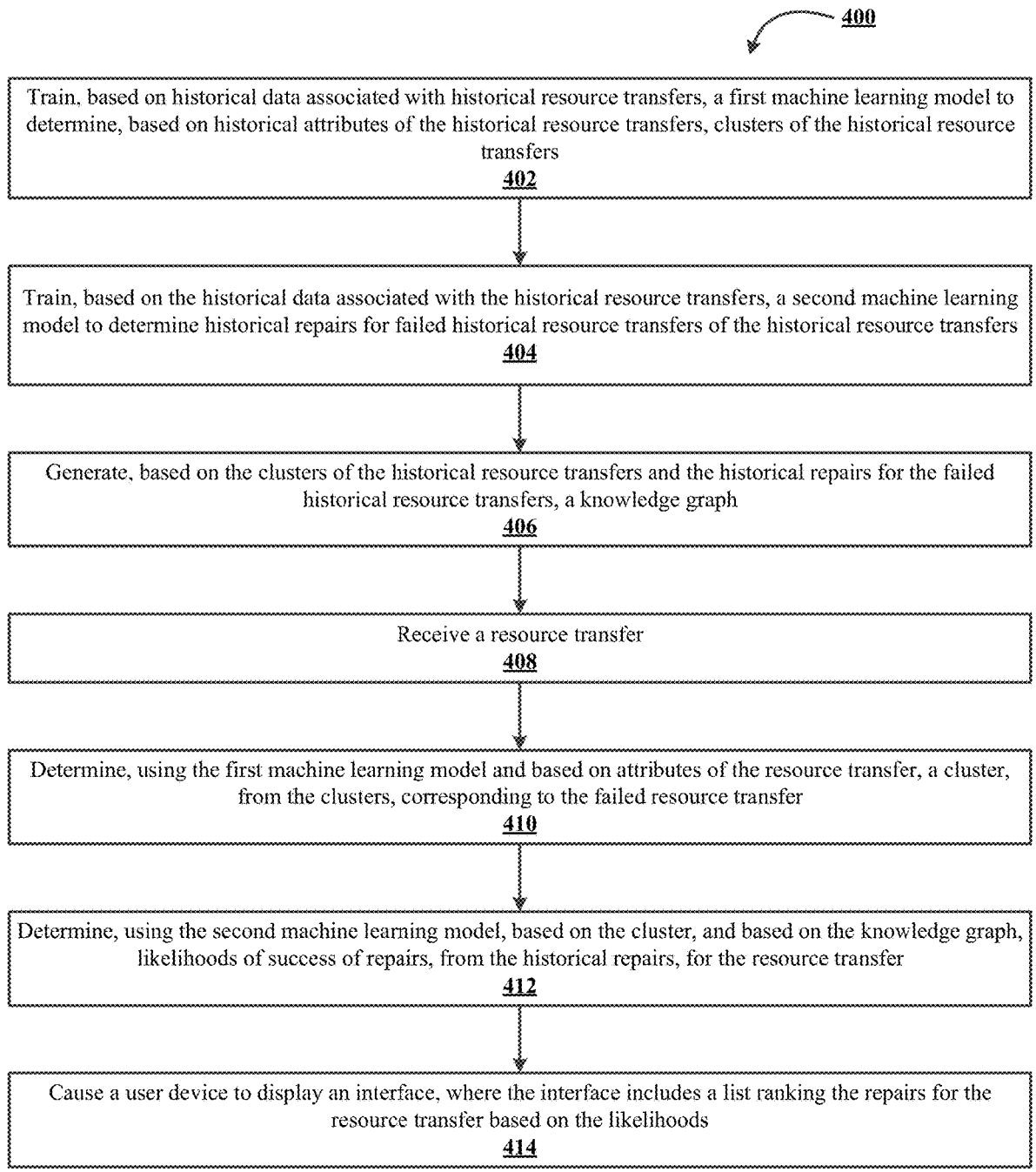

Having thus described embodiments of the invention in general terms, reference will now be made the accompanying drawings, wherein:

FIG. 1 illustrates technical components of a system for determining repairs for resource transfers using neural network deep embedded clustering, in accordance with an embodiment of the invention;

FIG. 2 illustrates a process flow for determining repairs for resource transfers using neural network deep embedded clustering, in accordance with an embodiment of the invention;

FIG. 3 illustrates an exemplary platform for determining repairs for resource transfers using neural network deep embedded clustering, in accordance with an embodiment of the invention; and FIG. 4 illustrates a process flow for determining repairs for resource transfers using neural network deep embedded clustering, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As noted, an electronic system may be configured to attempt to process resource transfers. The electronic system may be configured to generate, based on a failed attempt to process a resource transfer, an error code and provide the error code and the resource transfer to another system for repair. However, the repair of the resource transfer requires manual effort by a user to correct erroneous data in the resource transfer causing the error code. As the number of resource transfers and, in particular, the number of resource transfers that fail to process increases, the manual effort required and time required to perform the manual correction of the resource transfers that fail to process increases the likelihood that the resource transfers will not be processed in accordance with standards established for the electronic system (e.g., based on a service level agreement and/or the like). Furthermore, the delays caused by the manual correction are further increased by user error in selecting and performing repairs that do not correct the processing errors. Additionally, such manual correction and repeated manual correction (e.g., due to user error) consumes significant computing resources (e.g., processing resources, memory resources, power resources, communication resources, and/or the like) and/or network resources.

Some embodiments described herein provide a system, a computer program product, and/or a method for determining repairs for resource transfers using neural network deep embedded clustering. For example, a system (e.g., an electronic system for determining repairs for resource transfers using neural network deep embedded clustering and/or the like) may be configured to train, based on historical data associated with historical resource transfers, a first machine learning model to determine, based on historical attributes of the historical resource transfers, clusters of the historical resource transfers and train, based on the historical data associated with the historical resource transfers, a second machine learning model to determine historical repairs for failed historical resource transfers of the historical resource transfers. The system may be configured to generate, based on the clusters of the historical resource transfers and the historical repairs for the failed historical resource transfers, a knowledge graph and receive a resource transfer (e.g., a resource transfer to be processed, a resource transfer that failed to process, and/or the like). The system may be configured to determine, using the first machine learning model and based on attributes of the resource transfer, a cluster, from the clusters, corresponding to the resource transfer and determine, using the second machine learning model, based on the cluster and based on the knowledge graph, likelihoods of success of repairs, from the historical repairs, for the resource transfer. The system may be configured to cause a user device to display an interface, where the interface includes a list ranking the repairs for the resource transfer based on the likelihoods. The system may be configured to predict, based on the cluster determined using the first machine learning model, whether the resource transfer will fail to process and may proactively recommend repairs for the resource transfer before an attempt to process the resource transfer.

By using the first machine learning model to determine a cluster corresponding to the resource transfer and using the second machine learning model to determine the likelihoods of success of repairs based on the cluster, the system conserves computing resources (e.g., processing resources, memory resources, power resources, communication resources, and/or the like) and/or network resources that would otherwise be consumed by simply attempting to determine a repair for the resource transfer without determining the cluster or determining the likelihoods based on the cluster. Furthermore, by causing the user device to display the interface including a list ranking the repairs for the resource transfer based on the likelihoods, the system increases the likelihood that a user, using the device, will select a repair from the list that has the highest likelihood of success, which reduces the likelihood that a second repair attempt will need to be made on the resource transfer and reduces the likelihood of user error. By reducing the likelihood that second repair attempts will need to be made and reducing the likelihood of user error, the system conserves computing resources (e.g., processing resources, memory resources, power resources, communication resources, and/or the like) and/or network resources that would otherwise be consumed by repeated manual corrections. Additionally, by causing the user device to display the interface including a list ranking the repairs for the resource transfer based on the likelihoods, the system permits a user to select a repair from the list, which reduces the likelihood of the user performing a manual correction that includes a user error and/or is not likely to successfully repair the resource transfer, thereby conserving computing resources (e.g., processing resources, memory resources, power resources, communication resources, and/or the like) and/or network resources.

In some embodiments, the system may determine a likelihood that an attempt to process a resource transfer will fail (e.g., using a machine learning model, based on a cluster identified by a machine learning model, and/or the like) and determine whether the likelihood satisfies a threshold. The system may generate, based on determining that the likelihood satisfies the threshold (e.g., determining that an attempt to process the resource transfer is likely to fail) a list of recommended repairs for a resource transfer (e.g., a transaction and/or the like) before an attempt to process the transfer. A user may then select one of the repairs from the list for performing on the resource transfer. The system may use deep embedded clustering to generate, based on historical resource transfer data, clusters of resource transfers having similar characteristics and, for each cluster, learn from historical resource transfer data what repairs to perform on resource transfers when the resource transfers fail to process. The system may identify the repairs most likely to succeed on a cluster-by-cluster basis, rather than determining likelihoods of success for all repairs based on characteristics of a resource transfer, which conserves computing resources and increases the likelihood of success of the repairs. The system may use the clusters and the identified repairs to generate a knowledge graph. The system may receive data for a resource transfer (e.g., characteristics of the resource transfer) and use the knowledge graph to predict whether an attempt to process the resource transfer will fail and generate the list of recommended repairs (e.g., by identifying a cluster for the resource transfer and repairs associated with the cluster). The system may receive additional data associated with processed resource transfer and update the clusters, identify new repairs, and update the knowledge graph. In some embodiments, deep embedded clustering may include an artificial intelligence technique that learns feature representations and cluster assignments using neural networks.

As used herein, an "entity" may be any institution employing information technology resources and particularly technology infrastructure configured for processing large amounts of data. Typically, the data may be related to products, services, and/or the like offered and/or provided by the entity, customers of the entity, other aspect of the operations of the entity, people who work for the entity, and/or the like. As such, the entity may be an institution, group, association, financial institution, establishment, company, union, authority, merchant, service provider, and/or or the like, employing information technology resources for processing large amounts of data.

As used herein, a "user" may be an individual associated with an entity. As such, in some embodiments, the user may be an individual having past relationships, current relationships or potential future relationships with an entity. In some embodiments, a "user" may be an employee (e.g., an associate, a project manager, a manager, an administrator, an internal operations analyst, and/or the like) of the entity and/or enterprises affiliated with the entity, capable of operating systems described herein. In some embodiments, a "user" may be any individual, another entity, and/or a system who has a relationship with the entity, such as a customer, a prospective customer, and/or the like. In some embodiments, a user may be a system performing one or more tasks described herein.

As used herein, a "user interface" may be any device or software that allows a user to input information, such as commands and/or data, into a device, and/or that allows the device to output information to the user. For example, a user interface may include an application programmer interface (API), a graphical user interface (GUI), and/or an interface to input computer-executable instructions that direct a processing device to carry out functions. The user interface may employ input and/or output devices to input data received from a user and/or output data to a user. Input devices and/or output devices may include a display, API, mouse, keyboard, button, touchpad, touch screen, microphone, speaker, LED, light, joystick, switch, buzzer, bell, and/or other devices for communicating with one or more users.

As used herein, a "resource" may generally refer to computing resources, computing services, objects, products, devices, goods, commodities, services, offers, discounts, currency, cash, cash equivalents, rewards, reward points, benefit rewards, bonus miles, cash back, credits, and/or the like, and/or the ability and opportunity to access and use the same. Some example implementations herein contemplate property held by a user, including property that is stored and/or maintained by a third-party entity. In some example implementations, a resource may be associated with one or more accounts or may be property that is not associated with a specific account. Examples of resources associated with accounts may be accounts that have cash or cash equivalents, commodities, and/or accounts that are funded with or contain property, such as safety deposit boxes containing jewelry, art or other valuables, a trust account that is funded with property, and/or the like.

As used herein, a "source retainer" may generally refer to an account, a system, and/or the like associated with a user and/or a type of resources, such as software, a checking account, a deposit account, a savings account, a credit account, a rewards account, a rewards points account, a benefit rewards account, a bonus miles account, a cash back account, and/or the like, which may be managed and/or maintained by an entity, such as a financial institution, an electronic resource transfer institution (e.g., a credit card company, a debit card company, a prepaid card company, and/or the like), a credit union, and/or the like.

As used herein, a "distribution," a "transfer," and/or an "allocation" may refer to any transaction, activities, and/or communication between one or more entities, between a user and one or more entities, and/or the like. A resource distribution, a resource transfer, and/or an allocation of resources may refer to any distribution of resources such as, but not limited to, provision of computing resources, provision of computing services, a payment, processing of funds, purchase of goods or services, a return of goods or services, a payment transaction, a credit transaction, other interactions involving a user's resource or account, and/or the like. Unless specifically limited by the context, a "resource distribution," an "allocation of resources," a "resource transfer," a "transaction," a "transaction event," and/or a "point of transaction event" may refer to any activity between a user, a merchant, an entity, and/or the like. In the context of an entity such as a financial institution, a resource transfer may refer to one or more of: a sale of goods and/or services, initiating an automated teller machine (ATM) or online banking session, an account balance inquiry, a rewards transfer, an account money transfer or withdrawal, opening a bank application on a user's computer or mobile device, a user accessing their e-wallet, or any other interaction involving the user and/or the user's device that invokes or is detectable by the financial institution.

In some embodiments, the term "module" with respect to an apparatus may refer to a hardware component of the apparatus, a software component of the apparatus, and/or a component of the apparatus that includes both hardware and software. In some embodiments, the term "chip" may refer to an integrated circuit, a microprocessor, a system-on-a-chip, a microcontroller, and/or the like that may either be integrated into the external apparatus, may be inserted and/or removed from the external apparatus by a user, and/or the like.

As used herein, an "engine" may refer to core elements of a computer program, part of a computer program that serves as a foundation for a larger piece of software and drives the functionality of the software, and/or the like. An engine may be self-contained but may include externally controllable code that encapsulates powerful logic designed to perform or execute a specific type of function. In one aspect, an engine may be underlying source code that establishes file hierarchy, input and/or output methods, how a part of a computer program interacts and/or communicates with other software and/or hardware, and/or the like. The components of an engine may vary based on the needs of the computer program as part of the larger piece of software. In some embodiments, an engine may be configured to retrieve resources created in other computer programs, which may then be ported into the engine for use during specific operational aspects of the engine. An engine may be configurable to be implemented within any general-purpose computing system. In doing so, the engine may be configured to execute source code embedded therein to control specific features of the general-purpose computing system to execute specific computing operations, thereby transforming the general-purpose system into a specific purpose computing system.

As used herein, a "component" of an application may include a software package, a service, a resource, a module, and/or the like that includes a set of related functions and/or data. In some embodiments, a component may provide a source capability (e.g., a function, a business function, and/or the like) to an application including the component. In some embodiments, components of an application may communicate with each other via interfaces and may provide information to each other indicative of the services and/or functions that other components may utilize and/or how other components may utilize the services and/or functions. Additionally, or alternatively, components of an application may be substitutable such that a component may replace another component. In some embodiments, components may include objects, collections of objects, and/or the like.

As used herein, "authentication credentials" may be any information that may be used to identify a user. For example, a system may prompt a user to enter authentication information such as a username, a password, a token, a personal identification number (PIN), a passcode, biometric information (e.g., voice authentication, a fingerprint, and/or a retina scan), an answer to a security question, a unique intrinsic user activity, such as making a predefined motion with a user device, and/or the like. The authentication information may be used to authenticate the identity of the user (e.g., determine that the authentication information is associated with an account) and/or determine that the user has authority to access an account or system. In some embodiments, the system may be owned and/or operated by an entity. In such embodiments, the entity may employ additional computer systems, such as authentication servers, to validate and certify resources inputted by a plurality of users within the system. The system may further use authentication servers to certify the identity of users of the system, such that other users may verify the identity of the certified users. In some embodiments, the entity may certify the identity of the users. Furthermore, authentication information and/or permission may be assigned to and/or required from a user, application, computing node, computing cluster, and/or the like to access stored data within at least a portion of the system.

As used herein, an "interaction" may refer to any communication between one or more users, one or more entities or institutions, and/or one or more devices, nodes, clusters, and/or systems within the system environment described herein. For example, an interaction may refer to a transfer of data between devices, an accessing of stored data by one or more nodes of a computing cluster, a transmission of a requested task, and/or the like. In some embodiments, an interaction may refer to an entity, a user, a system, and/or a device providing an advertisement, information, data, a user interface, and/or the like to another entity, another user, another system, and/or another device.

FIG. 1 presents an exemplary block diagram of a system environment 100 for determining repairs for resource transfers using neural network deep embedded clustering within a technical environment, in accordance with an embodiment of the invention. FIG. 1 provides a system environment 100 that includes specialized servers and a system communicably linked across a distributive network of nodes required to perform functions of process flows described herein in accordance with embodiments of the present invention.

As illustrated, the system environment 100 includes a network 110, a system 130, and a user input system 140. Also shown in FIG. 1 is a user of the user input system 140. The user input system 140 may be a mobile computing device, a non-mobile computing device, and/or the like. The user may be a person who uses the user input system 140 to access, view modify, interact with, and/or the like information, data, images, video, and/or the like. The user may be a person who uses the user input system 140 to initiate, perform, monitor, and/or the like changes and/or modifications to one or more systems, applications, services, and/or the like. The one or more systems, applications, services, and/or the like may be configured to communicate with the system 130, input information onto a user interface presented on the user input system 140, and/or the like. The applications stored on the user input system 140 and the system 130 may incorporate one or more parts of any process flow described herein.

As shown in FIG. 1, the system 130 and the user input system 140 are each operatively and selectively connected to the network 110, which may include one or more separate networks. In some embodiments, the network 110 may include a telecommunication network, local area network (LAN), a wide area network (WAN), and/or a global area network (GAN), such as the Internet. Additionally, or alternatively, the network 110 may be secure and/or unsecure and may also include wireless and/or wired and/or optical interconnection technology. The network 110 may include one or more wired and/or wireless networks. For example, the network 110 may include a cellular network (e.g., a long-term evolution (LTE) network, a code division multiple access (CDMA) network, a 3G network, a 4G network, a 5G network, another type of next generation network, and/or the like), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

In some embodiments, the system 130 and the user input system 140 may be used to implement processes described herein, including user-side and server-side processes for determining repairs for resource transfers using neural network deep embedded clustering, in accordance with an embodiment of the present invention. The system 130 may represent various forms of digital computers, such as laptops, desktops, workstations, personal digital assistants, servers, blade servers, mainframes, automated teller machines, and/or the like. The user input system 140 may represent various forms of devices, such as personal digital assistants, cellular telephones, smartphones, smart glasses, desktops, workstations, automated teller machines, and/or the like. The components shown here, their connections, their relationships, and/or their functions, are meant to be exemplary only, and are not meant to limit implementations of the inventions described and/or claimed in this document.

In some embodiments, the system 130 may include a processor 102, memory 104, a storage device 106, a high-speed interface 108 connecting to memory 104, high-speed expansion ports 111, and a low-speed interface 112 connecting to low-speed bus 114 and storage device 106. Each of the components 102, 104, 106, 108, 111, and 112 may be interconnected using various buses, and may be mounted on a common motherboard or in other manners as appropriate. The processor 102 may process instructions for execution within the system 130, including instructions stored in the memory 104 and/or on the storage device 106 to display graphical information for a GUI on an external input/output device, such as a display 116 coupled to a high-speed interface 108. In some embodiments, multiple processors, multiple buses, multiple memories, multiple types of memory, and/or the like may be used. Also, multiple systems, same or similar to system 130, may be connected, with each system providing portions of the necessary operations (e.g., as a server bank, a group of blade servers, a multi-processor system, and/or the like). In some embodiments, the system 130 may be managed by an entity, such as a business, a merchant, a financial institution, a card management institution, a software and/or hardware development company, a software and/or hardware testing company, and/or the like. The system 130 may be located at a facility associated with the entity and/or remotely from the facility associated with the entity.

The memory 104 may store information within the system 130. In some embodiments, the memory 104 may be a volatile memory unit or units, such as volatile random-access memory (RAM) having a cache area for the temporary storage of information. In some embodiments, the memory 104 may be a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like. The memory 104 may store any one or more of pieces of information and data used by the system in which it resides to implement the functions of that system. In this regard, the system may dynamically utilize the volatile memory over the non-volatile memory by storing multiple pieces of information in the volatile memory, thereby reducing the load on the system and increasing the processing speed.

The storage device 106 may be capable of providing mass storage for the system 130. In one aspect, the storage device 106 may be or contain a computer-readable medium, such as a floppy disk device, a hard disk device, an optical disk device, a tape device, a flash memory and/or other similar solid state memory device, and/or an array of devices, including devices in a storage area network or other configurations. A computer program product may be tangibly embodied in an information carrier. The computer program product may also contain instructions that, when executed, perform one or more methods, such as those described herein. The information carrier may be a non-transitory computer-readable or machine-readable storage medium, such as the memory 104, the storage device 106, and/or memory on processor 102.

In some embodiments, the system 130 may be configured to access, via the network 110, a number of other computing devices (not shown). In this regard, the system 130 may be configured to access one or more storage devices and/or one or more memory devices associated with each of the other computing devices. In this way, the system 130 may implement dynamic allocation and de-allocation of local memory resources among multiple computing devices in a parallel and/or distributed system. Given a group of computing devices and a collection of interconnected local memory devices, the fragmentation of memory resources is rendered irrelevant by configuring the system 130 to dynamically allocate memory based on availability of memory either locally, or in any of the other computing devices accessible via the network. In effect, the memory may appear to be allocated from a central pool of memory, even though the memory space may be distributed throughout the system. Such a method of dynamically allocating memory provides increased flexibility when the data size changes during the lifetime of an application and allows memory reuse for better utilization of the memory resources when the data sizes are large.

The high-speed interface 108 may manage bandwidth-intensive operations for the system 130, while the low-speed interface 112 and/or controller manages lower bandwidth-intensive operations. Such allocation of functions is exemplary only. In some embodiments, the high-speed interface 108 is coupled to memory 104, display 116 (e.g., through a graphics processor or accelerator), and to high-speed expansion ports 111, which may accept various expansion cards (not shown). In some embodiments, low-speed interface 112 and/or controller is coupled to storage device 106 and low-speed bus 114 (e.g., expansion port). The low-speed bus 114, which may include various communication ports (e.g., USB, Bluetooth, Ethernet, wireless Ethernet), may be coupled to one or more input/output devices, such as a keyboard, a pointing device, a scanner, and/or a networking device such as a switch or router (e.g., through a network adapter).

The system 130 may be implemented in a number of different forms, as shown in FIG. 1. For example, it may be implemented as a standard server or multiple times in a group of such servers. Additionally, or alternatively, the system 130 may be implemented as part of a rack server system, a personal computer, such as a laptop computer, and/or the like. Alternatively, components from system 130 may be combined with one or more other same or similar systems and the user input system 140 may be made up of multiple computing devices communicating with each other.

FIG. 1 also illustrates a user input system 140, in accordance with an embodiment of the invention. The user input system 140 may include a processor 152, memory 154, an input/output device such as a display 156, a communication interface 158, and a transceiver 160, among other components, such as one or more image sensors. The user input system 140 may also be provided with a storage device, such as a microdrive and/or the like, to provide additional storage. Each of the components 152, 154, 158, and 160, may be interconnected using various buses, and several of the components may be mounted on a common motherboard or in other manners as appropriate.

The processor 152 may be configured to execute instructions within the user input system 140, including instructions stored in the memory 154. The processor 152 may be implemented as a chipset of chips that include separate and multiple analog and/or digital processors. The processor 152 may be configured to provide, for example, for coordination of the other components of the user input system 140, such as control of user interfaces, applications run by user input system 140, and/or wireless communication by user input system 140.

The processor 152 may be configured to communicate with the user through control interface 164 and display interface 166 coupled to a display 156. The display 156 may be, for example, a Thin-Film-Transistor Liquid Crystal Display (TFT LCD) or an Organic Light Emitting Diode (OLED) display, and/or other appropriate display technology. An interface of the display 156 may include appropriate circuitry and may be configured for driving the display 156 to present graphical and other information to a user. The control interface 164 may receive commands from a user and convert them for submission to the processor 152. In addition, an external interface 168 may be provided in communication with processor 152 to enable near area communication of user input system 140 with other devices. External interface 168 may provide, for example, for wired communication in some implementations, or for wireless communication in other implementations, and multiple interfaces may also be used.

The memory 154 may store information within the user input system 140. The memory 154 may be implemented as one or more of a computer-readable medium or media, a volatile memory unit or units, or a non-volatile memory unit or units. Expansion memory may also be provided and connected to user input system 140 through an expansion interface (not shown), which may include, for example, a Single In Line Memory Module (SIMM) card interface. Such expansion memory may provide extra storage space for user input system 140 and/or may store applications and/or other information therein. In some embodiments, expansion memory may include instructions to carry out or supplement the processes described above and/or may include secure information. For example, expansion memory may be provided as a security module for user input system 140 and may be programmed with instructions that permit secure use of user input system 140. Additionally, or alternatively, secure applications may be provided via the SIMM cards, along with additional information, such as placing identifying information on the SIMM card in a secure manner. In some embodiments, the user may use applications to execute processes described with respect to the process flows described herein. For example, one or more applications may execute the process flows described herein. In some embodiments, one or more applications stored in the system 130 and/or the user input system 140 may interact with one another and may be configured to implement any one or more portions of the various user interfaces and/or process flow described herein.

The memory 154 may include, for example, flash memory and/or NVRAM memory. In some embodiments, a computer program product may be tangibly embodied in an information carrier. The computer program product may contain instructions that, when executed, perform one or more methods, such as those described herein. The information carrier may be a computer-readable or machine-readable medium, such as the memory 154, expansion memory, memory on processor 152, and/or a propagated signal that may be received, for example, over transceiver 160 and/or external interface 168.

In some embodiments, the user may use the user input system 140 to transmit and/or receive information and/or commands to and/or from the system 130. In this regard, the system 130 may be configured to establish a communication link with the user input system 140, whereby the communication link establishes a data channel (wired and/or wireless) to facilitate the transfer of data between the user input system 140 and the system 130. In doing so, the system 130 may be configured to access one or more aspects of the user input system 140, such as, a GPS device, an image capturing component (e.g., camera), a microphone, a speaker, and/or the like.

The user input system 140 may communicate with the system 130 (and one or more other devices) wirelessly through communication interface 158, which may include digital signal processing circuitry. Communication interface 158 may provide for communications under various modes or protocols, such as GSM voice calls, SMS, EMS, or MMS messaging, CDMA, TDMA, PDC, WCDMA, CDMA2000, GPRS, and/or the like. Such communication may occur, for example, through transceiver 160. Additionally, or alternatively, short-range communication may occur, such as using a Bluetooth, Wi-Fi, and/or other such transceiver (not shown). Additionally, or alternatively, a Global Positioning System (GPS) receiver module 170 may provide additional navigation-related and/or location-related wireless data to user input system 140, which may be used as appropriate by applications running thereon, and in some embodiments, one or more applications operating on the system 130.

The user input system 140 may also communicate audibly using audio codec 162, which may receive spoken information from a user and convert it to usable digital information. Audio codec 162 may likewise generate audible sound for a user, such as through a speaker (e.g., in a handset) of user input system 140. Such sound may include sound from voice telephone calls, may include recorded sound (e.g., voice messages, music files, and/or the like) and may also include sound generated by one or more applications operating on the user input system 140, and in some embodiments, one or more applications operating on the system 130.

Various implementations of the systems and techniques described here may be realized in digital electronic circuitry, integrated circuitry, specially designed ASICs (application specific integrated circuits), computer hardware, firmware, software, and/or combinations thereof. Such various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and/or at least one output device.

Computer programs (e.g., also referred to as programs, software, applications, code, and/or the like) may include machine instructions for a programmable processor, and may be implemented in a high-level procedural and/or object-oriented programming language, and/or in assembly/machine language. As used herein, the terms "machine-readable medium" and/or "computer-readable medium" may refer to any computer program product, apparatus and/or device (e.g., magnetic discs, optical disks, memory, Programmable Logic Devices (PLDs), and/or the like) used to provide machine instructions and/or data to a programmable processor, including a machine-readable medium that receives machine instructions as a machine-readable signal. The term "machine-readable signal" may refer to any signal used to provide machine instructions and/or data to a programmable processor.

To provide for interaction with a user, the systems and/or techniques described herein may be implemented on a computer having a display device (e.g., a CRT (cathode ray tube), an LCD (liquid crystal display) monitor, and/or the like) for displaying information to the user, a keyboard by which the user may provide input to the computer, and/or a pointing device (e.g., a mouse or a trackball) by which the user may provide input to the computer. Other kinds of devices may be used to provide for interaction with a user as well. For example, feedback provided to the user may be any form of sensory feedback (e.g., visual feedback, auditory feedback, and/or tactile feedback). Additionally, or alternatively, input from the user may be received in any form, including acoustic, speech, and/or tactile input.

The systems and techniques described herein may be implemented in a computing system that includes a back end component (e.g., as a data server), that includes a middleware component (e.g., an application server), that includes a front end component (e.g., a client computer having a graphical user interface or a Web browser through which a user may interact with an implementation of the systems and techniques described here), and/or any combination of such back end, middleware, and/or front end components. Components of the system may be interconnected by any form or medium of digital data communication (e.g., a communication network). Examples of communication networks include a local area network ("LAN"), a wide area network ("WAN"), and/or the Internet.

In some embodiments, computing systems may include clients and servers. A client and server may generally be remote from each other and typically interact through a communication network. The relationship of client and server may arise by virtue of computer programs running on the respective computers and having a client-server relationship to each other.

The embodiment of the system environment 100 illustrated in FIG. 1 is exemplary and other embodiments may vary. As another example, in some embodiments, the system 130 includes more, less, or different components. As another example, in some embodiments, some or all of the portions of the system environment 100, the system 130, and/or the user input system 140 may be combined into a single portion. Likewise, in some embodiments, some or all of the portions of the system environment 100, the system 130, and/or the user input system 140 may be separated into two or more distinct portions.

In some embodiments, the system environment 100 may include one or more resource transfer analysis and repair systems, one or more resource transfer processing systems, one or more resource transfer repair systems, entity systems, entity devices, user devices, and/or the like (e.g., one or more of which may be similar to the system 130 and/or the user input system 140) associated with one or more entities (e.g., businesses, merchants, financial institutions, card management institutions, software and/or hardware development companies, software and/or hardware testing companies, and/or the like). In some embodiments, the one or more resource transfer analysis and repair systems, one or more resource transfer processing systems, one or more resource transfer repair systems, entity systems, entity devices, user devices, and/or the like may perform one or more of the steps described herein with respect to the process flows described herein with respect to FIGS. 2 and/or 4.

FIG. 2 illustrates a process flow 200 for determining repairs for resource transfers using neural network deep embedded clustering, in accordance with an embodiment of the invention. In some embodiments, one or more resource transfer analysis and repair systems, one or more resource transfer processing systems, one or more resource transfer repair systems, entity systems, entity devices, user devices, and/or the like (e.g., similar to one or more of the systems described herein with respect to FIG. 1) may perform one or more of the steps of process flow 200.

As shown in FIG. 2, the process flow 200 may include an error database (e.g., one or more databases that include data, such as statistics, associated with failed attempts to process resource transfers), a resource transfer database, a smart repair recommender engine, and resource transfers processing applications. As also shown in FIG. 2, the smart repair recommender engine may include a resource transfer modelling—deep embedded clustering system, a model database, a matching and recommendation system, and a knowledge graph for entity mapping.

In some embodiments, the smart repair recommender engine may use deep embedded clustering to group historical resource transfer data (e.g., historical transaction data) based on various features and identify repairs (e.g., fixes) for resource transfer failures (e.g., transactions and/or payments that fail to process via straight through processing). Data relevant to error codes and repairs may be captured, by the smart repair recommender engine, in the knowledge graph, which may be an artificial intelligence-based entity mapping. In some embodiments, when a new resource transfer enters the resource transfer processing channels, the smart repair recommender engine may match the new resource transfer with clusters instead of individual resource transfers and recommend a repair based on association rule mining from the knowledge graph.

In some embodiments, the smart repair recommender engine may rank error codes as per volume and obtain resource transfer data relevant to the error codes. Additionally, or alternatively, the smart repair recommender engine may, once the resource transfer data is retrieved, cluster the resource transfer data based first on error code and then based on different features, attributes, characteristics, and/or the like, such as regions, branches currency, clearing centers, amount of resources, and/or the like.

In some embodiments, the smart repair recommender engine may identify a repair for each resource transfer within a cluster and repeat such identification for each of the clusters. For example, the smart repair recommender engine may identify a repair by comparing input data and output data using a distance formula (e.g., a Minkowski distance, a Euclidean distance, and/or the like). Additionally, or alternatively, the smart repair recommender engine may update the knowledge graph with all possible repairs for a given error code and rank the possible repairs by volume (e.g., with a repair historically used more frequently than the others for the given error code at a top of the ranking and/or the like).

In some embodiments, the smart repair recommender engine may match incoming resource transfer data with the clusters. For example, the smart repair recommender engine may receive an incoming resource transfer and/or data for the incoming resource transfer and determine to which cluster the incoming resource transfer and/or the data belongs (e.g., based on features, attributes, characteristics, and/or the like of the incoming resource transfer and/or the data and features, attributes, characteristics, and/or the like of the clusters). As another example, the smart repair recommender engine may use resource transfer modelling and/or deep embedded clustering to generate deep embedded clusters and match an incoming resource transfer from a resource transfer initiating channel to a deep embedded cluster using adaptive matching. Additionally, or alternatively, the smart repair recommender engine may predict possible error codes for the incoming resource transfer and/or the data based on the cluster to which the incoming resource transfer and/or the data is matched and/or fit.

In some embodiments, the smart repair recommender engine may generate rules based on incoming resource transfer data and the clusters to which the incoming resource transfer data is matched in the knowledge graph. For example, the smart repair recommender engine may generate the rules by finding a frequent item (e.g., a repair, an error code, and/or the like), mapping the item to a cluster, and generating strong association rules to recommend a repair from the knowledge graph. In this regard, rather than conventional association rule mining which generates a larger number of rules based on the entire data set, the smart repair recommender engine may use association rule mining on already clustered data, which generates a smaller number of rules, thereby conserving computing resources (e.g., processing resources, memory resources, power resources, communication resources, and/or the like) and/or network resources. Additionally, or alternatively, the smart repair recommender engine may recommend repairs (e.g., by causing a user device, such as a user device associated with an initiating channel, to display an interface including the repairs and/or the like) from the knowledge graph (e.g., to a resource transfer initiation channel and/or the like).

In some embodiments, the smart repair recommender engine may regenerate the clusters using new resource transfer data (e.g., on a frequent basis, such as hourly, daily, weekly, monthly, and/or the like). For example, the smart repair recommender engine, after generating the clusters based on historical resource transfer data and/or receiving additional resource transfer data for processed resource transfers, may regenerate the clusters based on both the historical resource transfer data and the additional resource transfer data to obtain updated clusters, which may be used for newly received resource transfers and/or resource transfer data. Furthermore, the smart repair recommender engine may use the updated clusters and/or the additional resource transfer data to update the knowledge graph, rank repairs for the error codes, and/or the like.

In some embodiments, the smart repair recommender engine may perform data frame ranking for error codes and/or error code and resource transfer data retrieval. Additionally, or alternatively, the smart repair recommender engine may perform deep embedded clustering for the resource transfers and/or repair identification. In some embodiments, the smart repair recommender engine may perform data frame ranking for the repairs. Additionally, or alternatively, the smart repair recommender engine may create and/or update the knowledge graph (e.g., based on a model version, an output, and/or the like). In some embodiments, the smart repair recommender engine may perform resource transfer matching and/or cluster identification. Additionally, or alternatively, the smart repair recommender engine may recommend a repair using association rule mining and/or based on a collaborative recommendation from the knowledge graph.

As shown in FIG. 2, the process flow 200 may include performing exploratory data analysis on data in the error database and updating the resource transfer database. In some embodiments, the process flow 200 may include performing resource transfer data modelling, such as deep embedded clustering, on data in the resource transfer database. As also shown in FIG. 2, the process flow 200 may include generating, updating, and/or the like the model database using the information obtained by performing resource transfer data modelling, such as deep embedded clustering, on data in the resource transfer database. Additionally, or alternatively, the process flow 200 may include generating, updating, and/or the like the knowledge graph using the information obtained by performing resource transfer data modelling, such as deep embedded clustering, on data in the resource transfer database.

As shown in FIG. 2, the process flow 200 may include using the matching and recommendation system to access the model database and/or the knowledge graph to provide a recommended repair to a resource transfer initiation system. For example, the process flow 200 may include receiving resource transfer data and/or characteristics as a result of an attempt to process a resource transfer, using the matching and recommendation system to access the model database and/or the knowledge graph to determine a recommended repair and/or a list of recommended repairs for the resource transfer, and providing the recommended repair and/or the list of recommended repairs to a resource transfer initiation system.

As shown in FIG. 2, the process flow 200 may include performing a repair on the resource transfer and initiating processing on the resource transfer by providing the repaired resource transfer to one or more resource transfer processing applications. In some embodiments, and as shown in FIG. 2, the process flow 200 may include updating the resource transfer database with data, information, and/or the like from the one or more resource transfer processing applications.

Process flow 200 may include additional embodiments, such as any single embodiment or any combination of embodiments described below and/or in connection with one or more other processes described elsewhere herein. Although FIG. 2 shows example blocks of process flow 200, in some embodiments, process flow 200 may include additional blocks, fewer blocks, different blocks, or differently arranged blocks than those depicted in FIG. 2. Additionally, or alternatively, two or more of the blocks of process flow 200 may be performed in parallel.

FIG. 3 illustrates an exemplary platform 300 for determining repairs for resource transfers using neural network deep embedded clustering, in accordance with an embodiment of the invention. In some embodiments, the platform 300 may perform one or more of the steps described herein with respect to the process flows described herein with respect to FIGS. 2 and/or 4. As shown in FIG. 3, the platform 300 may include a data provider, a data gateway, a data service, a database, a business intelligence and search engine (e.g., using a tableau platform, a kibana platform, and/or the like), a resource transfer processing system, and one or more resource transfer initiation channels. As also shown in FIG. 3, the data provider may include one or more servers (e.g., a SQL server and/or the like) and/or one or more databases (e.g., an IMS database and/or the like).

In some embodiments, the data gateway may include middleware (e.g., a rest API, json, and/or the like), and the data service may include a smart repair recommender engine (e.g., similar to the smart repair recommender engine described herein with respect to FIG. 2). Additionally, or alternatively, the database may include model and/or data storage (e.g., Hadoop distributed file system, a mongoDB system, a Hive system, and/or the like).

Platform 300 may include additional embodiments, such as any single embodiment or any combination of embodiments described below and/or in connection with one or more other systems and/or processes described elsewhere herein. Although FIG. 3 shows example blocks of platform 300, in some embodiments, platform 300 may include additional blocks, fewer blocks, different blocks, or differently arranged blocks than those depicted in FIG. 3. Additionally, or alternatively, two or more of the blocks of platform 300 may be integrated with each other.

FIG. 4 illustrates a process flow 400 for determining repairs for resource transfers using neural network deep embedded clustering, in accordance with an embodiment of the invention. In some embodiments, one or more resource transfer analysis and repair systems, one or more resource transfer processing systems, one or more resource transfer repair systems, entity systems, entity devices, user devices, and/or the like (e.g., similar to one or more of the systems described herein with respect to FIG. 1) may perform one or more of the steps of process flow 400.

As shown in block 402, the process flow 400 may include training, based on historical data associated with historical resource transfers, a first machine learning model to determine, based on historical attributes of the historical resource transfers, clusters of the historical resource transfers. For example, a resource transfer analysis and repair system may train, based on historical data associated with historical resource transfers, a first machine learning model to determine, based on historical attributes of the historical resource transfers, clusters of the historical resource transfers.

As shown in block 404, the process flow 400 may include training, based on the historical data associated with the historical resource transfers, a second machine learning model to determine historical repairs for failed historical resource transfers of the historical resource transfers. For example, a resource transfer analysis and repair system may train, based on the historical data associated with the historical resource transfers, a second machine learning model to determine historical repairs for failed historical resource transfers of the historical resource transfers.

As shown in block 406, the process flow 400 may include generating, based on the clusters of the historical resource transfers and the historical repairs for the failed historical resource transfers, a knowledge graph. For example, a resource transfer analysis and repair system may generate, based on the clusters of the historical resource transfers and the historical repairs for the failed historical resource transfers, a knowledge graph.

As shown in block 408, the process flow 400 may include receiving a resource transfer. For example, a resource transfer analysis and repair system may receive a resource transfer, characteristics and/or attributes associated with the resource transfer, resource transfer data and/or the like.

As shown in block 410, the process flow 400 may include determining, using the first machine learning model and based on attributes of the resource transfer, a cluster, from the clusters, corresponding to the resource transfer. For example, a resource transfer analysis and repair system may determine, using the first machine learning model and based on attributes of the resource transfer, a cluster, from the clusters, corresponding to the resource transfer.

As shown in block 412, the process flow 400 may include determining, using the second machine learning model, based on the cluster and based on the knowledge graph, likelihoods of success of repairs, from the historical repairs, for the resource transfer. For example, a resource transfer analysis and repair system may determine, using the second machine learning model, based on the cluster and based on the knowledge graph, likelihoods of success of repairs, from the historical repairs, for the resource transfer.

As shown in block 414, the process flow 400 may include causing a user device to display an interface, where the interface includes a list ranking the repairs for the resource transfer based on the likelihoods. For example, a resource transfer analysis and repair system may cause a user device to display an interface, where the interface includes a list ranking the repairs for the resource transfer based on the likelihoods.

Process flow 400 may include additional embodiments, such as any single embodiment or any combination of embodiments described below and/or in connection with one or more other processes described elsewhere herein.

In a first embodiment, the historical data may include the historical attributes of the historical resource transfers, and the historical attributes may include characteristics of the historical resource transfers, outcomes of processing the historical resource transfers, error codes from failed historical resource transfers, repairs applied to the failed historical resource transfers, and outcomes of processing repaired historical resource transfers.

In a second embodiment alone or in combination with the first embodiment, the process flow 400 may include, when training the second machine learning model to determine the repairs for the failed historical resource transfers, training the second machine learning model to determine, for each cluster of the clusters, a subset of the repairs for the failed historical resource transfers within the cluster In a third embodiment alone or in combination with any of the first through second embodiments, the process flow 400 may include, when training the second machine learning model to determine, for each cluster of the clusters, the subset of the repairs for the failed historical resource transfers within the cluster, training the second machine learning model to determine, for each failed historical resource transfer within the cluster, a repair for the failed historical resource transfer.

In a fourth embodiment alone or in combination with any of the first through third embodiments, the process flow 400 may include determining the attributes of the resource transfer.

In a fifth embodiment alone or in combination with any of the first through fourth embodiments, the process flow 400 may include determining, based on the cluster corresponding to the resource transfer and based on the knowledge graph, the repairs, from the historical repairs, for the resource transfer In a sixth embodiment alone or in combination with any of the first through fifth embodiments, the process flow 400 may include when causing the user device to display the interface, causing the user device to display the interface, where the list includes a drop-down menu having a repair, of the repairs, having a highest likelihood at a top of the drop-down menu.

In a seventh embodiment alone or in combination with any of the first through sixth embodiments, the process flow 400 may include receiving, from the user device, an indication of user input selecting, via the interface, a repair of the repairs from the list.

In an eighth embodiment alone or in combination with any of the first through seventh embodiments, the process flow 400 may include performing, in response to receiving the indication, the repair on the resource transfer.

In a ninth embodiment alone or in combination with any of the first through eighth embodiments, the process flow 400 may include, after training the first machine learning model, after training the second machine learning model, and after generating the knowledge graph, receiving additional data associated with additional resource transfers processed after the historical resource transfers and retraining, based on the additional data and based on the historical data, the first machine learning model to determine updated clusters of the additional resource transfers and the historical resource transfers.

In a tenth embodiment alone or in combination with any of the first through ninth embodiments, the process flow 400 may include, after training the first machine learning model, after training the second machine learning model, and after generating the knowledge graph, retraining, based on the additional data and the historical data, the second machine learning model to determine updated repairs for the failed historical resource transfers and failed additional resource transfers of the additional resource transfers.

In an eleventh embodiment alone or in combination with any of the first through tenth embodiments, the process flow 400 may include, after training the first machine learning model, after training the second machine learning model, and after generating the knowledge graph, regenerating, based on the updated clusters and the updated repairs, the knowledge graph.

In a twelfth embodiment alone or in combination with any of the first through eleventh embodiments, the process flow 400 may include, after training the first machine learning model, after training the second machine learning model, and after generating the knowledge graph, receiving another resource transfer, determining, using the first machine learning model and based on attributes of the other resource transfer, another cluster, from the updated clusters, corresponding to the other resource transfer, determining, using the second machine learning model, based on the other cluster corresponding to the other resource transfer and based on the knowledge graph, likelihoods of success of repairs, from the historical repairs, for the other resource transfer, and causing the user device to display another interface, where the other interface includes another list ranking the repairs for the other resource transfer based on the likelihoods.

In a thirteenth embodiment alone or in combination with any of the first through twelfth embodiments, the additional data may include additional attributes of the additional resource transfers, and the additional attributes may include characteristics of the additional resource transfers, outcomes of processing the additional resource transfers, characteristics from failed additional resource transfers, repairs applied to the failed additional resource transfers, and outcomes of processing repaired additional resource transfers.

In a fourteenth embodiment alone or in combination with any of the first through thirteenth embodiments, the process flow 400 may include generating, based on the additional data, based on the historical data, and based on the knowledge graph, a report including the historical repairs for the failed historical resource transfers and additional repairs performed on failed additional resource transfers of the additional resource transfers, where the historical repairs and the additional repairs are grouped in the report based on at least one of error codes or the clusters and causing another user device to display another interface including the report.

In a fifteenth embodiment alone or in combination with any of the first through fourteenth embodiments, the historical attributes of the historical resource transfers may include historical characteristics of the historical resource transfers, where the historical characteristics include, for each historical resource transfer of the historical resource transfers, a geographic region of origin of the historical resource transfer, a building of origin of the historical resource transfer, a currency of the historical resource transfer, a processing center that attempted to process the historical resource transfer, and an amount of resources of the historical resource transfer.

In a sixteenth embodiment alone or in combination with any of the first through fifteenth embodiments, the attributes of the resource transfer may include characteristics of the resource transfer, where the characteristics include a geographic region of origin of the resource transfer, a building of origin of the resource transfer, a currency of the resource transfer, a processing center that attempted to process the resource transfer, and an amount of resources of the resource transfer.

In a seventeenth embodiment alone or in combination with any of the first through sixteenth embodiments, the process flow 400 may include determining the historical repairs for the failed historical resource transfers by comparing, for each of the failed historical resource transfers, input data provided for processing the failed historical resource transfer and output data generated after the failed historical resource transfer successfully processed.

Although FIG. 4 shows example blocks of process flow 400, in some embodiments, process flow 400 may include additional blocks, fewer blocks, different blocks, or differently arranged blocks than those depicted in FIG. 4. Additionally, or alternatively, two or more of the blocks of process flow 400 may be performed in parallel.

As noted above, in some embodiments, the process flows described herein may include performing one or more of the functions described herein using artificial intelligence, machine learning, a machine learning model, and/or the like. For example, the system may provide data and/or metadata associated with resource transfers to a machine learning model trained (e.g., using data associated with historical resource transfers, data associated with processing resource transfers, data associated with repairing resource transfers, data associated with outcomes of attempts to repair resource transfers, data associated with outcomes of attempts to process repaired resource transfers, and/or the like) to output clusters of historical resource transfers (e.g., having similar attributes, characteristics, and/or the like). As another example, the system may provide data and/or metadata associated with resource transfers to a machine learning model trained (e.g., using data associated with historical resource transfers, data associated with processing resource transfers, data associated with repairing resource transfers, data associated with outcomes of attempts to repair resource transfers, data associated with outcomes of attempts to process repaired resource transfers, and/or the like) to output historical repairs for failed historical resource transfers of the historical resource transfers. As yet another example, the system may provide data and/or metadata associated with resource transfers to a machine learning model trained (e.g., using data associated with historical resource transfers, data associated with processing resource transfers, data associated with repairing resource transfers, data associated with outcomes of attempts to repair resource transfers, data associated with outcomes of attempts to process repaired resource transfers, and/or the like) to output one or more thresholds.

In some embodiments, the system may be configured to implement any of the following applicable machine learning algorithms either singly or in combination: supervised learning (e.g., using logistic regression, using back propagation neural networks, using random forests, decision trees, and/or the like), unsupervised learning (e.g., using an Apriori algorithm, using K-means clustering), semi-supervised learning, reinforcement learning (e.g., using a Q-learning algorithm, using temporal difference learning), and any other suitable learning style. Each module of the system may implement any one or more of: a regression algorithm (e.g., ordinary least squares, logistic regression, stepwise regression, multivariate adaptive regression splines, locally estimated scatterplot smoothing, and/or the like), an instance-based method (e.g., k-nearest neighbor, learning vector quantization, self-organizing map, and/or the like), a regularization method (e.g., ridge regression, least absolute shrinkage and selection operator, elastic net, and/or the like), a decision tree learning method (e.g., classification and regression tree, iterative dichotomiser 3, C4.5, chi-squared automatic interaction detection, decision stump, random forest, multivariate adaptive regression splines, gradient boosting machines, and/or the like), a Bayesian method (e.g., naïve Bayes, averaged one-dependence estimators, Bayesian belief network, and/or the like), a kernel method (e.g., a support vector machine, a radial basis function, an LDA, and/or the like), a clustering method (e.g., k-means clustering, expectation maximization, and/or the like), an associated rule learning algorithm (e.g., an Apriori algorithm, an Eclat algorithm, and/or the like), an artificial neural network model (e.g., a Perceptron method, a back-propagation method, a Hopfield network method, a self-organizing map method, a learning vector quantization method, and/or the like), a deep learning algorithm (e.g., a restricted Boltzmann machine, a deep belief network method, a convolution network method, a stacked auto-encoder method, and/or the like), a dimensionality reduction method (e.g., principal component analysis, partial least squares regression, Sammon mapping, multidimensional scaling, projection pursuit, and/or the like), an ensemble method (e.g., boosting, bootstrapped aggregation, AdaBoost, stacked generalization, gradient boosting machine method, random forest method, and/or the like), and any suitable form of machine learning algorithm. Each processing portion of the system may additionally or alternatively leverage a probabilistic module, heuristic module, deterministic module, or any other suitable module leveraging any other suitable computation method, machine learning method or combination thereof. However, any suitable machine learning approach may otherwise be incorporated in the system. Further, any suitable model (e.g., machine learning, non-machine learning, and/or the like) may be used in generating data relevant to the system. In some embodiments, the one or more machine learning algorithms may be predictive modeling algorithms configured to use data and statistics to predict outcomes with forecasting models.

In some embodiments, the machine learning models may be generated by training on data associated with historical resource transfers, data associated with processing resource transfers, data associated with repairing resource transfers, data associated with outcomes of attempts to repair resource transfers, data associated with outcomes of attempts to process repaired resource transfers, and/or the like over a predetermined past period of time. In doing so, the system may be configured to generate likelihoods, thresholds, clusters, repairs, lists of repairs, and/or the like. In some embodiments, the one or more machine learning algorithms may be used to calculate likelihoods, and whether the likelihoods satisfy a threshold. Additionally, or alternatively, the system may continuously re-train the machine learning model using data associated with historical resource transfers, data associated with processing resource transfers, data associated with repairing resource transfers, data associated with outcomes of attempts to repair resource transfers, data associated with outcomes of attempts to process repaired resource transfers, and/or the like.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory) that may direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

Some implementations are described herein in connection with thresholds. As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, or the like.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments may be configured without departing from the scope and spirit of the invention. Therefore, it is to be understood that, within the scope of the appended claims, the invention may be practiced other than as specifically described herein.

What is claimed is:
1. A system for determining repairs for resource transfers using neural network deep embedded clustering, the system comprising:
at least one processing device; and
at least one non-transitory storage device comprising computer-executable program code that, when executed by the at least one processing device, causes the at least one processing device to:
train, based on historical data associated with historical resource transfers, a first machine learning model to determine, based on historical attributes of the historical resource transfers, clusters of the historical resource transfers, wherein the historical resource transfers comprise historical transactions in currencies;
train, based on the historical data associated with the historical resource transfers, a second machine learning model to determine historical repairs for failed historical resource transfers of the historical resource transfers, wherein the failed historical resource transfers comprise historical transactions that fail to process via straight through processing;
generate, based on the clusters of the historical resource transfers and the historical repairs for the failed historical resource transfers, a knowledge graph;
generate, based on the historical data associated with the historical resource transfers and the historical repairs for the failed historical resource transfers, association rules for each cluster of the clusters, wherein each association rule of the association rules recommends a repair of the historical repairs for a given cluster;
receive a resource transfer in a resource transfer processing channel, wherein the resource transfer comprises a transaction in a currency, and wherein the resource transfer is initiated by a user device associated with the resource transfer processing channel for processing by a resource transfer processing system;
determine, using the first machine learning model and based on attributes of the resource transfer, a cluster, from the clusters, corresponding to the resource transfer;
determine, using the second machine learning model, based on the cluster, based on association rules for the cluster, and based on the knowledge graph, likelihoods of success of repairs, from the historical repairs, for the resource transfer;
cause, before the processing by the resource transfer processing system, the user device to display an interface, wherein the interface comprises a list ranking the repairs for the resource transfer based on the likelihoods, and wherein the list comprises a drop-down menu including the repairs for selection by a user of the user device;
receive, from the user device, an indication of user input selecting, via the interface, a repair of the repairs from the list;
perform, in response to receiving the indication, the repair on the resource transfer to obtain a repaired resource transfer; and
provide the repaired resource transfer to the resource transfer processing system for processing.

2. The system of claim 1, wherein the historical data comprises the historical attributes of the historical resource transfers, and wherein the historical attributes comprise characteristics of the historical resource transfers, outcomes of processing the historical resource transfers, error codes from failed historical resource transfers, repairs applied to the failed historical resource transfers, and outcomes of processing repaired historical resource transfers.

3. The system of claim 1, wherein the at least one non-transitory storage device comprises computer-executable program code that, when executed by the at least one processing device, causes the at least one processing device to, when training the second machine learning model to determine the repairs for the failed historical resource transfers, train the second machine learning model to determine, for each cluster of the clusters, a subset of the repairs for the failed historical resource transfers within the cluster.

4. The system of claim 3, wherein the at least one non-transitory storage device comprises computer-executable program code that, when executed by the at least one processing device, causes the at least one processing device to, when training the second machine learning model to determine, for each cluster of the clusters, the subset of the repairs for the failed historical resource transfers within the cluster, train the second machine learning model to determine, for each failed historical resource transfer within the cluster, a repair for the failed historical resource transfer.

5. The system of claim 1, wherein the at least one non-transitory storage device comprises computer-executable program code that, when executed by the at least one processing device, causes the at least one processing device to determine the attributes of the resource transfer.

6. The system of claim 1, wherein the at least one non-transitory storage device comprises computer-executable program code that, when executed by the at least one processing device, causes the at least one processing device to determine, based on the cluster corresponding to the resource transfer and based on the knowledge graph, the repairs, from the historical repairs, for the resource transfer.

7. The system of claim 1, wherein the at least one non-transitory storage device comprises computer-executable program code that, when executed by the at least one processing device, causes the at least one processing device to, when causing the user device to display the interface, cause the user device to display the interface, wherein the drop-down menu has a repair, of the repairs, having a highest likelihood at a top of the drop-down menu.

8. The system of claim 1, wherein the at least one non-transitory storage device comprises computer-executable program code that, when executed by the at least one processing device, causes the at least one processing device to, after training the first machine learning model, after training the second machine learning model, and after generating the knowledge graph:
receive additional data associated with additional resource transfers processed after the historical resource transfers; and
retrain, based on the additional data and based on the historical data, the first machine learning model to determine updated clusters of the additional resource transfers and the historical resource transfers.

9. The system of claim 8, wherein the at least one non-transitory storage device comprises computer-executable program code that, when executed by the at least one processing device, causes the at least one processing device to, after training the first machine learning model, after training the second machine learning model, and after generating the knowledge graph:
retrain, based on the additional data and the historical data, the second machine learning model to determine updated repairs for the failed historical resource transfers and failed additional resource transfers of the additional resource transfers.

10. The system of claim 9, wherein the at least one non-transitory storage device comprises computer-executable program code that, when executed by the at least one processing device, causes the at least one processing device to, after training the first machine learning model, after training the second machine learning model, and after generating the knowledge graph:
    regenerate, based on the updated clusters and the updated repairs, the knowledge graph.

11. The system of claim 10, wherein the at least one non-transitory storage device comprises computer-executable program code that, when executed by the at least one processing device, causes the at least one processing device to, after training the first machine learning model, after training the second machine learning model, and after generating the knowledge graph:
    receive another resource transfer;
    determine, using the first machine learning model and based on attributes of the other resource transfer, another cluster, from the updated clusters, corresponding to the other resource transfer;
    determine, using the second machine learning model, based on the other cluster corresponding to the other resource transfer and based on the knowledge graph, likelihoods of success of repairs, from the historical repairs, for the other resource transfer; and
    cause the user device to display another interface, wherein the other interface comprises another list ranking the repairs for the other resource transfer based on the likelihoods.

12. The system of claim 8, wherein the additional data comprises additional attributes of the additional resource transfers, and wherein the additional attributes comprise characteristics of the additional resource transfers, outcomes of processing the additional resource transfers, error codes from failed additional resource transfers, repairs applied to the failed additional resource transfers, and outcomes of processing repaired additional resource transfers.

13. The system of claim 8, wherein the at least one non-transitory storage device comprises computer-executable program code that, when executed by the at least one processing device, causes the at least one processing device to:
    generate, based on the additional data, based on the historical data, and based on the knowledge graph, a report comprising the historical repairs for the failed historical resource transfers and additional repairs performed on failed additional resource transfers of the additional resource transfers, wherein the historical repairs and the additional repairs are grouped in the report based on at least one of error codes or the clusters; and
    cause another user device to display another interface comprising the report.

14. The system of claim 1, wherein the historical attributes of the historical resource transfers comprise historical characteristics of the historical resource transfers, and wherein the historical characteristics comprise, for each historical resource transfer of the historical resource transfers, a geographic region of origin of the historical resource transfer, a building of origin of the historical resource transfer, a currency of the historical resource transfer, a processing center that attempted to process the historical resource transfer, and an amount of resources of the historical resource transfer.

15. The system of claim 14, wherein the attributes of the resource transfer comprise characteristics of the resource transfer, and wherein the characteristics comprise a geographic region of origin of the resource transfer, a building of origin of the resource transfer, a currency of the resource transfer, a processing center that attempted to process the resource transfer, and an amount of resources of the resource transfer.

16. The system of claim 1, wherein the at least one non-transitory storage device comprises computer-executable program code that, when executed by the at least one processing device, causes the at least one processing device to determine the historical repairs for the failed historical resource transfers by comparing, for each of the failed historical resource transfers, input data provided for processing the failed historical resource transfer and output data generated after the failed historical resource transfer successfully processed.

17. A method for determining repairs for resource transfers using neural network deep embedded clustering, the method comprising:
    training, based on historical data associated with historical resource transfers, a first machine learning model to determine, based on historical attributes of the historical resource transfers, clusters of the historical resource transfers, wherein the historical resource transfers comprise historical transactions in currencies;
    training, based on the historical data associated with the historical resource transfers, a second machine learning model to determine historical repairs for failed historical resource transfers of the historical resource transfers, wherein the failed historical resource transfers comprise historical transactions that fail to process via straight through processing;
    generating, based on the clusters of the historical resource transfers and the historical repairs for the failed historical resource transfers, a knowledge graph;
    generating, based on the historical data associated with the historical resource transfers and the historical repairs for the failed historical resource transfers, association rules for each cluster of the clusters, wherein each association rule of the association rules recommends a repair of the historical repairs for a given cluster;
    receiving a resource transfer in a resource transfer processing channel, wherein the resource transfer comprises a transaction in a currency, and wherein the resource transfer is initiated by a user device associated with the resource transfer processing channel for processing by a resource transfer processing system;
    determining, using the first machine learning model and based on attributes of the resource transfer, a cluster, from the clusters, corresponding to the resource transfer;
    determining, using the second machine learning model, based on the cluster, based on association rules for the cluster, and based on the knowledge graph, likelihoods of success of repairs, from the historical repairs, for the resource transfer;
    causing, before the processing by the resource transfer processing system, the user device to display an interface, wherein the interface comprises a list ranking the repairs for the resource transfer based on the likelihoods, and wherein the list comprises a drop-down menu including the repairs for selection by a user of the user device;
    receiving, from the user device, an indication of user input selecting, via the interface, a repair of the repairs from the list;
    performing, in response to receiving the indication, the repair on the resource transfer to obtain a repaired resource transfer; and providing the repaired resource transfer to the resource transfer processing system for processing.

18. The method of claim 17, comprising, when training the second machine learning model to determine the repairs for the failed historical resource transfers, training the second machine learning model to determine, for each cluster of the clusters, a subset of the repairs for the failed historical resource transfers within the cluster.

19. A computer program product for determining repairs for resource transfers using neural network deep embedded clustering, the computer program product comprising a non-transitory computer-readable medium comprising code that, when executed by a first apparatus, causes the first apparatus to:
- train, based on historical data associated with historical resource transfers, a first machine learning model to determine, based on historical attributes of the historical resource transfers, clusters of the historical resource transfers, wherein the historical resource transfers comprise historical transactions in currencies;
- train, based on the historical data associated with the historical resource transfers, a second machine learning model to determine historical repairs for failed historical resource transfers of the historical resource transfers, wherein the failed historical resource transfers comprise historical transactions that fail to process via straight through processing;
- generate, based on the clusters of the historical resource transfers and the historical repairs for the failed historical resource transfers, a knowledge graph;
- generate, based on the historical data associated with the historical resource transfers and the historical repairs for the failed historical resource transfers, association rules for each cluster of the clusters, wherein each association rule of the association rules recommends a repair of the historical repairs for a given cluster;
- receive a resource transfer in a resource transfer processing channel, wherein the resource transfer comprises a transaction in a currency, and wherein the resource transfer is initiated by a user device associated with the resource transfer processing channel for processing by a resource transfer processing system;
- determine, using the first machine learning model and based on attributes of the resource transfer, a cluster, from the clusters, corresponding to the resource transfer;
- determine, using the second machine learning model, based on the cluster, based on association rules for the cluster, and based on the knowledge graph, likelihoods of success of repairs, from the historical repairs, for the resource transfer;
- cause, before the processing by the resource transfer processing system, the user device to display an interface, wherein the interface comprises a list ranking the repairs for the resource transfer based on the likelihoods, and wherein the list comprises a drop-down menu including the repairs for selection by a user of the user device;
- receive, from the user device, an indication of user input selecting, via the interface, a repair of the repairs from the list;
- perform, in response to receiving the indication, the repair on the resource transfer to obtain a repaired resource transfer; and
- provide the repaired resource transfer to the resource transfer processing system for processing.

20. The method of claim 17, wherein the historical data comprises the historical attributes of the historical resource transfers, and wherein the historical attributes comprise characteristics of the historical resource transfers, outcomes of processing the historical resource transfers, error codes from failed historical resource transfers, repairs applied to the failed historical resource transfers, and outcomes of processing repaired historical resource transfers.

* * * * *